(12) United States Patent
Minick et al.

(10) Patent No.: US 7,246,483 B2
(45) Date of Patent: Jul. 24, 2007

(54) ENERGETIC DETONATION PROPULSION

(75) Inventors: Alan B. Minick, Stuart, FL (US);
Benjamin Goldberg, Palm City, FL (US); Larry Knauer, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/895,777

(22) Filed: Jul. 21, 2004

(65) Prior Publication Data

US 2006/0016168 A1    Jan. 26, 2006

(51) Int. Cl.
*F02K 7/02* (2006.01)

(52) U.S. Cl. ............... 60/204; 60/212; 60/247; 60/39.821; 60/257

(58) Field of Classification Search .......... 60/257–260, 60/39.821, 39.827, 212, 213, 200.1, 202, 60/203.1, 247
See application file for complete search history.

(56) References Cited

U.S. PATENT DOCUMENTS

| | | | | |
|---|---|---|---|---|
| 2,725,718 A * | 12/1955 | Sheets et al. | ............ | 60/39.827 |
| 3,035,412 A * | 5/1962 | Poujade | .................. | 60/39.821 |
| 3,041,824 A * | 7/1962 | Berhman | .................. | 60/203.1 |
| 3,110,294 A * | 11/1963 | Nyman | ........................ | 60/247 |
| 3,137,993 A * | 6/1964 | Tyson, Jr. | ..................... | 60/211 |
| 3,143,851 A * | 8/1964 | Nyman | ........................ | 60/259 |
| 3,283,508 A * | 11/1966 | Schulze | ....................... | 60/259 |
| 3,651,644 A | 3/1972 | Breen et al. | | |
| 3,712,227 A | 1/1973 | Turner | | |
| 5,605,039 A | 2/1997 | Meyer et al. | | |
| 5,640,843 A | 6/1997 | Aston | | |
| 5,836,150 A * | 11/1998 | Garcia | .................... | 60/39.821 |
| 6,484,492 B2 * | 11/2002 | Meholic et al. | .............. | 60/247 |
| 6,655,127 B2 * | 12/2003 | Kruse et al. | ................. | 60/259 |
| 6,895,743 B1 * | 5/2005 | McElheran et al. | ...... | 60/39.827 |
| 2004/0231318 A1* | 11/2004 | Fisher | ........................ | 60/258 |

FOREIGN PATENT DOCUMENTS

| | | |
|---|---|---|
| EP | 0 132 065 A2 | 1/1985 |
| JP | 60-67789 | 4/1985 |

* cited by examiner

*Primary Examiner*—Ted Kim
(74) *Attorney, Agent, or Firm*—Bachman & LaPointe

(57) ABSTRACT

A propulsion system for creating a propulsive force has a combustion chamber, a pair of electrodes within the combustion chamber and a power supply attached to the electrodes to create a high voltage field within an initiation zone of the combustion chamber, and an injector for introducing a propellant, preferably in atomized form, into the high voltage field for creating the propulsive force. In a preferred embodiment of the present invention, the propellant is hydrogen peroxide. In another embodiment of the present invention, a second propellant is introduced into the combustion chamber for increasing the propulsive force.

33 Claims, 1 Drawing Sheet

ENERGETIC DETONATION PROPULSION

BACKGROUND OF THE INVENTION (1) Field of the Invention

The present invention relates to a propulsion system for creating a propulsive force for a vehicle and more particularly to a propulsion system which involves the detonation of propellants, with or without secondary propellants, through electrostatic initiation of detonation, or exothermal decomposition.

(2) Prior Art

Rocket propulsion using propellants such as liquid hydrogen, liquid oxygen, and liquid hydrogen peroxide has been around for decades. Typically, the propellants are mixed in a combustion chamber and ignited to create a propulsive force. In some hypergolic systems, two propellants are mixed in a combustion chamber to create a propulsive force without the use of any electrical ignition.

Despite the existence of these systems, there remains a need for new rocket propulsion techniques which generate more propulsive force.

SUMMARY OF THE INVENTION

Accordingly, it is an object of the present invention to provide an improved method for creating a propulsive force.

It is a further object of the present invention to provide an improved propulsion system for use with vehicles.

The foregoing objects are attained by the present invention.

In accordance with the present invention, a propulsion system for creating a propulsive force broadly comprises a combustion chamber, means for creating a high voltage field within an initiation zone of said combustion chamber, and means for introducing a propellant into said high voltage field for creating a propulsive force. In a preferred embodiment of the present invention, the propellant is hydrogen peroxide.

Further, in accordance with the present invention, a method for creating a propulsive force broadly comprises the steps of providing a combustion chamber, creating a high voltage field within an initiation zone of said combustion chamber, and creating a propulsive force by introducing a propellant into said high voltage field.

Other details of the energetic detonation propulsion of the present invention, as well as other objects and advantages attendant thereto, are set forth in the following detailed description and the accompanying drawing wherein like reference numerals depict like elements.

DETAILED DESCRIPTION OF THE PREFERRED EMBODIMENT(S)

Figure 1:
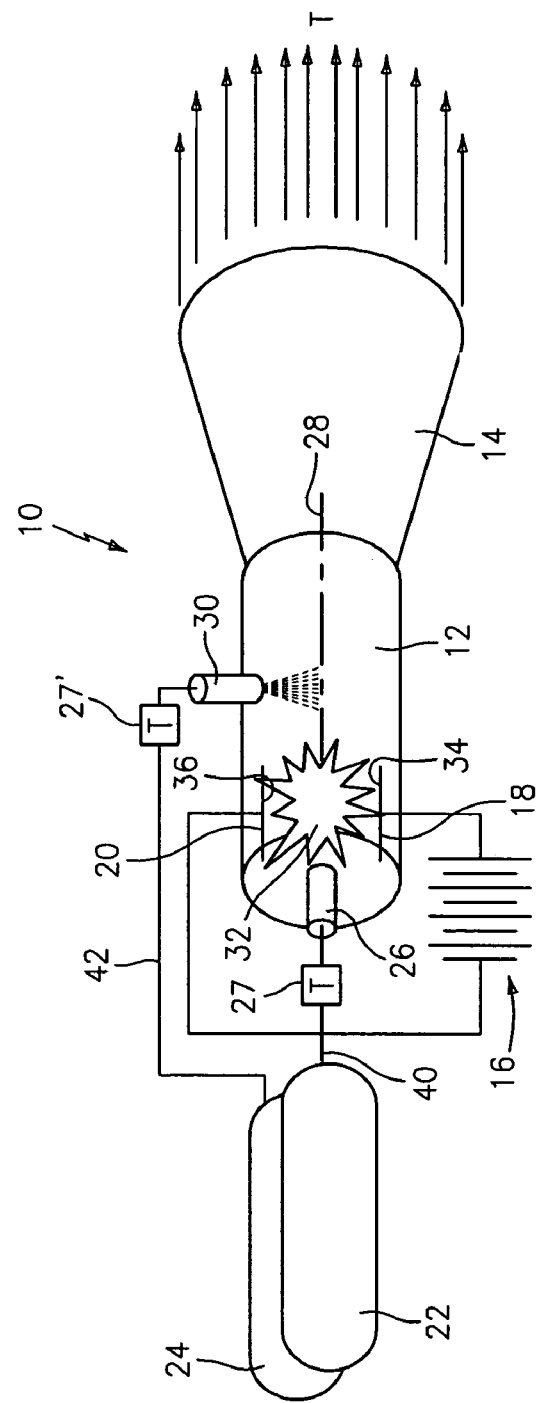
FIG. 1 illustrates an electrostatic detonation propulsion system in accordance with the present invention.

Referring now to FIG. 1, a propulsion system 10 is illustrated. The propulsion system 10 includes a combustion chamber 12 and a nozzle 14 attached to the combustion chamber 12. The combustion chamber 12 may comprise any suitable combustion chamber known in the art. Similarly, the nozzle 14 may comprise any suitable nozzle configuration known in the art. As shown in the Figure for example, the nozzle 14 may be a diverging nozzle.

The propulsion system 10 further includes a power source 16 and a pair of spaced apart electrodes 18 and 20. The power source 16 may comprise any suitable power source known in the art. For example, the power source 16 may be a variable power source that generates a variable potential. The electrodes 18 and 20 may be plate electrodes or grid electrodes and may be formed from any suitable electrically conductive electrode material known in the art. If desired, each of the electrodes 18 and 20 may be consumable electrodes formed from a consumable electrically conductive material.

Still further, the propulsion system 10 may include a first propellant source 22 and an optional second propellant source 24. The propellant source 22 may contain a first propellant, preferably in liquid form, such as liquid hydrogen peroxide. The propellant source 22 may be connected to a first injector 26 which is used to atomize the propellant being introduced into the injector 26 and which disperses the atomized propellant into the gap 32 between the electrodes 18 and 20. Preferably, the injector 26 is aligned along a central axis 28 of the combustion chamber 12 so that the atomized propellant is discharged in a direction parallel to the direction of thrust. The injector 26 may comprise any suitable injector known in the art for atomizing a propellant. A first turbine 27 may be provided to provide pressure for the propellant flow. The first turbine 27 may comprise any suitable turbine known in the art and may be connected to the source 22 in any suitable manner known in the art.

The optional second propellant source 24 may be connected to an optional second injector 30 which is used to atomize the second propellant and to discharge the second propellant into the combustion chamber 12. The second injector 30 is preferably aligned to discharge atomized propellant in a direction substantially perpendicular to the central axis 28. As before, the injector 30 may comprise any suitable injector known in the art for atomizing a propellant. A second turbine 27' may be used to create the pressure for the second propellant flow. The turbine 27' may also comprise any suitable turbine known in the art and may be connected to the second propellant source 24 in any suitable manner known in the art.

If desired, valves (not shown) may be incorporated into the flow lines 40 and 42 between the sources 22 and 24 and the injectors 26 and 30. The valves may be used to regulate, including pulsing, the flow of propellant from the sources 22 and 24 to the injectors 26 and 30.

Within the combustion chamber 12 is a dielectric media. The dielectric media may be air, a vacuum, or any other suitable dielectric media.

In operation, a high voltage electric field, preferably a field in the range of 20 kv to 50 kv, is created across the dielectric media between the separated charged electrodes 18 and 20 by activating the power source 16. Preferably, the voltage level is such that a potential near 75 kv per inch is created. The charged field is initially maintained below the breakdown potential limit. Once this state is established, the introduction of another media with a different dielectric, such as the propellant from the first source 22, into the gap 32 between the electrodes 18 and 20 intensifies the local field strength, exceeding the breakdown limits, resulting in a distributed energy discharge surrounding the introduced media (propellant), and at the faces 34 and 36 of the electrodes 18 and 20 respectively.

The propellant from the source 22 is atomized in the injector 26 and introduced into the gap 32 in atomized form.

Atomization of the propellant creates a high surface area to volume ratio. Introduction of the atomized propellant into the electric field creates, almost instantaneously, a plasma discharge which, in turn, creates a propagation wave which flows through the combustion chamber 12 at high speeds, some exceeding sonic velocities, and which creates an increased pressure as the plasma discharge moves down the combustion chamber 12 towards the nozzle 14, all of this resulting in a propulsive force or thrust T.

If needed, the electric potential applied to the electrodes 18 and 20 by the power source 16 may be regulated to induce a required energy discharge and an interaction with the electrodes 18 and 20 if they are consumable. As discussed above, the power source 16 may be a variable power source which allows the electric potential to be regulated. The resulting energization of the propellant from the first source 22 should cause phase change of the propellant and/or detonation/deflagration of the propellant. If consumable electrodes are used, additional energy release will occur from secondary reactions of the combustion or decomposition products with the vaporized electrode constituents.

As discussed above, a second propellant, in atomized form, may be introduced into the combustion chamber 12 downstream of the initiation zone or gap 32. The second propellant is preferably different from the first propellant. For example, the first propellant may be liquid hydrogen peroxide and the second propellant may be liquid ethanol. By using a second propellant and by injecting the second propellant through the injector 30 into the discharge path ahead of the propagation wave, additional combustion will occur once the propagation wave passes. This additional combustion occurs in a region of elevated pressure following the wave front. As a result, it will further elevate the pressure in the combustion chamber 12, thereby increasing thrust and effectiveness.

For some propellant combinations, the propellants may be injected concurrently, directly, or embedded or incorporated into the electrodes in the initiation zone to optimize the peculiar reaction of each combination.

The propellant reaction rate determines the exhaust velocity and performance. The decomposition of a hydrogen peroxide propellant is advantageous in that it may generate supersonic shock.

While not shown, the combustion chamber 12 may be a shaped chamber for achieving a particular effect. Further, the exit nozzle 14 may be a diffusing exhaust if desired. Additionally, reflected shock paths may be incorporated into the system to optimize capabilities.

The propulsion system of the present invention may be used to propel a wide variety of vehicles. For example, the propulsion system may be used to create orbital propulsion for a spacecraft. It may also be used to create propulsion for long distance spacecraft such as vehicles which travel to Mars.

While hydrogen peroxide has been described as being the first propellant and ethanol has been described as being the second propellant, other propellant combinations may be used if desired. Also, if desired, the first and second propellants could be the same propellant. This would have the advantage of eliminating one of the propellant sources 22 and 24—a potential weight saving.

Figure 2:
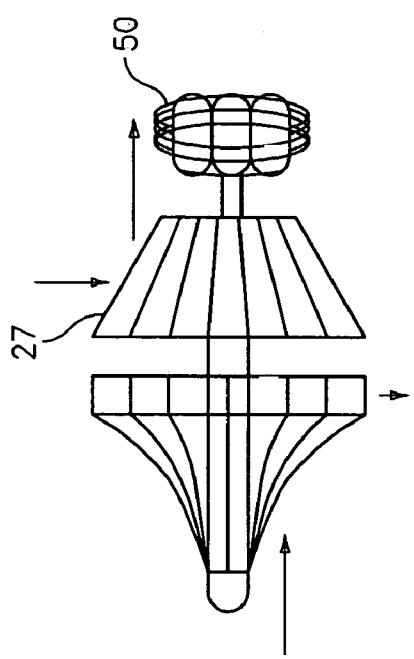
FIG. 2 illustrates a generator attached to a turbine used in the system of FIG. 1.

If desired, an electromagnetic system may be incorporated into the propulsion system by running a generator 50 off of a turbine 27 used to provide pressure for the propellant flow as shown in FIG. 2.

The propulsion system of the present invention is further advantageous in that it does no require the use of any complex turbomachinery or ancillary systems. All that is required is simple separate liquid injectors.

It is apparent that there has been provided in accordance with the present invention an energetic detonation propulsion system which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A propulsion system for use with vehicles comprising:
   a combustion chamber having an outlet end and a nozzle attached to said outlet end;
   means for creating a high voltage field within an initiation zone of said combustion chamber;
   said high voltage field creating means comprising a pair of spaced apart electrodes creating a gap and a power source electrically connected to said electrodes;
   said electrodes being selected from the group consisting of plate electrodes and grid electrodes; and
   means for introducing a propellant into said gap for creating a propulsive force so as to create a plasma discharge caused by said electrodes which creates a propagation wave which flows through said combustion chamber and which exits said combustion chamber via said nozzle.

2. A propulsion system according to claim 1, wherein said electrodes comprise plate electrodes.

3. A propulsion system according to claim 1, wherein said electrodes comprise grid electrodes.

4. A propulsion system according to claim 1, wherein said electrodes comprise consumable electrodes for enhancing the propulsive force.

5. A propulsion system according to claim 1, wherein said power source is a variable power source.

6. A propulsion system according to claim 1, wherein said propellant introducing means comprises a first propellant source and a first injector in fluid communication with said first propellant source and wherein said first injector atomizes said first propellant and discharges said atomized first propellant into said initiation zone.

7. A propulsion system according to claim 6, wherein said propellant introducing means comprises a second propellant source and a second injector in communication with said second propellant source and wherein said second injector atomizes said second propellant and discharges said atomized second propellant into said combustion chamber.

8. A propulsion system according to claim 7, wherein said first propellant is different from said second propellant.

9. A propulsion system according to claim 8, wherein said first propellant is a hydrogen peroxide propellant and said second propellant is an ethanol propellant.

10. A propulsion system according to claim 7, wherein said first injector is oriented along a first axis and said second injector is oriented along a second axis perpendicular to said first axis.

11. A propulsion system according to claim 6, further comprising a second turbine connected to said second injector for providing pressure for the flow of said second propellant.

12. A propulsion system according to claim 6, further comprising a first turbine connected to said first injector for providing pressure for the flow of said first propellant.

13. A propulsion system according to claim 1, further comprising a dielectric media in said combustion chamber and said dielectric media being located between said electrodes.

14. A propulsion system according to claim 13, wherein said dielectric media is air.

15. A propulsion system according to claim 13, wherein said dielectric media comprises a vacuum.

16. A propulsion system according to claim 13, further comprising an electric field in the range of 20 kV to 50 kv across said dielectric media.

17. A space vehicle having the propulsion system of claim 1.

18. A propulsion system for use with vehicles comprising:
a combustion chamber;
means for creating a high voltage field within an initiation zone of said combustion chamber;
means for introducing a propellant into said high voltage field for creating a propulsive force;
said propellant introducing means comprising a first propellant source and a first injector in fluid communication with said first propellant source and said first injector atomizing said first propellant and discharging said atomized first propellant into said initiation zone; and
said propellant introducing means further comprising a second propellant source and a second injector in communication with said second propellant source and said second injector atomizing said second propellant and discharging said atomized second propellant into said combustion chamber,
wherein said second injector discharges said atomized second propellant into said combustion chamber at a location downstream of said initiation zone.

19. A method for creating a propulsive force comprising the steps of:
providing a combustion chamber;
creating a high voltage field within an initiation zone of said combustion chamber;
said high voltage field creating step comprising providing a pair of spaced apart electrodes in said initiation zone with a gap between said electrodes;
said electrodes providing step comprising providing a pair of electrodes selected from the group consisting of plate electrodes and grid electrodes;
creating a propulsive force by introducing a propellant into said initiation zone; and
said propulsive force creating step comprising introducing an atomized propellant into said gap so as to create a plasma discharge caused by said electrodes which creates a propagation wave which flows through said combustion chamber and which exits said combustion chamber via a nozzle attached to said combustion chamber.

20. A method according to claim 19, wherein said high voltage field creating step comprises connecting a power source to said electrodes, and applying a potential to said electrodes via said power source.

21. A method according to claim 20, wherein said electrode providing step comprises providing a pair of plate electrodes.

22. A method according to claim 20, wherein said electrode providing step comprises providing a pair of grid electrodes.

23. A method according to claim 20, wherein said electrode providing step comprises providing a pair of consumable electrodes to enhance the propulsive force which is created.

24. A method according to claim 19, wherein said propellant introducing step comprises providing a first source containing a first propellant and a first injector for atomizing said first propellant and introducing said first propellant in atomized form into said gap in said initiation zone to create said plasma discharge, to increase pressure within the combustion chamber, and to create said propulsive force.

25. A method according to claim 24, wherein said propellant introducing step comprises providing a second source containing a second propellant and a second injector for atomizing said second propellant and introducing said second propellant in atomized form into said combustion chamber.

26. A method according to claim 25, wherein said first propellant introducing step comprises introducing hydrogen peroxide into said initiation zone and said second propellant introducing step comprises introducing ethanol into said combustion chamber.

27. A method according to claim 25, wherein said first propellant introducing step comprises introducing said first propellant along a first axis and said second propellant introducing step comprises introducing said second propellant along a second axis perpendicular to said first axis.

28. A method according to claim 19, further comprising providing a dielectric media between said electrodes and wherein said high voltage field creating step comprises creating an electric field in the range of 20 kv to 50 kv across the dielectric media.

29. A method according to claim 28, wherein said high voltage field creating step comprises using a voltage level which creates a potential near 75 kV per inch.

30. A method according to claim 19, wherein said high voltage field creating step comprises maintaining said field below a breakdown potential limit and introducing said propellant into the gap between the electrodes so that local field strength exceeds said breakdown potential limit resulting in a distributed energy discharge surrounding the propellant and at faces of said electrodes.

31. The method according to claim 19, wherein said propulsive force creating step comprises regulating electric potential to cause phase change of the propellant.

32. The method according to claim 31, wherein said regulating step comprises regulating said electric potential to cause said propellant to detonate.

33. A method for creating a propulsive force comprising the steps of:
providing a combustion chamber;
creating a high voltage field within an initiation zone of said combustion chamber;
creating a propulsive force by introducing a propellant into said initiation zone;
said propellant introducing step comprising providing a first source containing a first propellant and a first injector for atomizing said first propellant and introducing said first propellant in atomized form into said initiation zone to create a plasma discharge, to increase pressure within the combustion chamber, and to create said propulsive force; and
said propellant introducing step further comprising providing a second source containing a second propellant and a second injector for atomizing said second propellant and introducing said second propellant in atomized form into said combustion chamber,
wherein said second propellant introducing step comprises introducing said second propellant downstream of said initiation zone.

* * * * *